United States Patent
Horiuchi

(10) Patent No.: US 7,628,835 B2
(45) Date of Patent: Dec. 8, 2009

(54) STRUCTURE FOR HOLDING FIXING SCREWS

(75) Inventor: Tadanori Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 477 days.

(21) Appl. No.: 11/530,201

(22) Filed: Sep. 8, 2006

(65) Prior Publication Data

US 2007/0065323 A1   Mar. 22, 2007

Related U.S. Application Data

(60) Provisional application No. 60/715,152, filed on Sep. 9, 2005.

(51) Int. Cl.
*E05C 17/00* (2006.01)
*F01N 3/00* (2006.01)

(52) U.S. Cl. ............... 55/385.3; 55/495; 55/503; 55/523; 55/DIG. 30; 123/198 E; 60/297; 60/311; 292/149; 292/248; 292/276; 292/291; 292/294; 29/33.2; 29/103; 29/104; 29/105; 29/214; 29/215; 29/216; 29/264; 29/265

(58) Field of Classification Search ............... 55/385.3, 55/DIG. 30, 495, 503, 523; 123/198 E; 60/297, 60/311; 292/149, 206, 291, 294, 248, 276; 411/64, 105, 347; 29/33.2, 264, 265, 103–105, 29/214–216

See application file for complete search history.

(56) References Cited

U.S. PATENT DOCUMENTS

| | | | | |
|---|---|---|---|---|
| 3,779,013 A | * | 12/1973 | Faber et al. | 60/278 |
| 5,388,400 A | * | 2/1995 | Hoppenstedt et al. | 60/274 |
| 5,582,146 A | * | 12/1996 | Linsbauer et al. | 123/198 E |
| 5,758,496 A | * | 6/1998 | Rao et al. | 60/295 |
| 5,912,370 A | * | 6/1999 | McConkey | 55/385.3 |
| 6,547,845 B2 | * | 4/2003 | Grant, Sr. | 55/385.1 |
| 7,234,296 B2 | * | 6/2007 | Kojima | 60/311 |

FOREIGN PATENT DOCUMENTS

| | | |
|---|---|---|
| JP | 10-85539 A | 4/1998 |
| JP | 2000-104631 A | 4/2000 |

* cited by examiner

*Primary Examiner*—Robert A Hopkins
*Assistant Examiner*—Minh-Chau T Pham
(74) *Attorney, Agent, or Firm*—Westerman, Hattori, Daniels & Adrian, LLP

(57) ABSTRACT

In a fastening portion for fastening an upper retaining portion and a lower retaining portion by means of a mounting screw, the upper retaining portion has a screw hole and a cylindrical guide formed around and above the screw hole. Further, a projection is formed on the inner wall of the cylindrical guide at an upper portion thereof. In a loosened condition of the mounting screw where it is disengaged from a screw hole, the head portion of the mounting screw is caught to be retained by the projection. The upper portion of the cylindrical guide is tapered so that it has an inner diameter smaller than the diameter of the head portion of the mounting screw. Accordingly, even when the upper retaining portion is turned upside down in the loosened condition of the mounting screw, the mounting screw does not fall down from the upper retaining portion.

8 Claims, 7 Drawing Sheets

STRUCTURE FOR HOLDING FIXING SCREWS

This application claims benefit of earlier filed U.S. Provisional Application No. 60/715,152 filed on Sep. 9, 2005.

BACKGROUND OF THE INVENTION

The present invention relates to a mounting screw retainer structure, and more particularly to a mounting screw retainer structure which can prevent a mounting screw from falling down from a component and can also prevent the interference of the mounting screw with any other related component.

RELATED ART

A conventional means for fastening vertically separate components, such as an air cleaner box and its cover, is the use of a screw, wing nut, band, etc.

Described in Japanese Patent Laid-open 2000-104631 is a means for fastening vertically separate cases constituting an air cleaner box, wherein an elongated bolt is connected to the lower case and the upper end of the bolt inserted through the upper case is tightened by a wing nut. Further, described in Japanese Patent Laid-open Hei 10-85539 is a means using a detachable one-touch fastener or the like for fastening a pleated main filter and a flexible high-porous prefilter in an air cleaner.

However, in such a layout that any other related component is arranged close to the air cleaner box and that the upper space above the air cleaner box is especially narrow, there is a problem such that a screw or the like for fastening the air cleaner box and its cover may erroneously fall down in removing the cover. There is another problem such that if the screw retained by the cover projects therefrom, the screw may interfere with any other related component in removing the cover, causing an increase in number of working steps. Neither suggestion nor consideration is given with respect to these problems in above-cited references.

SUMMARY OF THE INVENTION

It is accordingly an object of the present invention to provide a mounting screw retainer structure which can prevent a mounting screw from falling down from a component and can also prevent the interference of the mounting screw with any other related component.

In order to attain the above mentioned object, according to the present invention, there is provided a retainer structure for a mounting screw for fastening separate cases, characterized in that one of the separate cases is formed with a screw hole and a guide communicating with the upper end of the screw hole, that the guide has an inner diameter equal to or slightly larger than the diameter of a head portion of the mounting screw, that a projection is formed on the inner wall of the guide at an upper portion thereof, and that the distance between the projection and the lower end of the screw hole is slightly smaller than the length of a threaded portion of the mounting screw.

As another feature of the invention, the projection retains the head portion of the mounting screw in a loosened condition of the mounting screw, and the upper portion of the guide is tapered so that it has an inner diameter slightly smaller than the diameter of the head portion of the mounting screw.

As still another feature, the separate cases include a cover and a case constituting an air cleaner box.

As an additional feature, the air cleaner box is located in a narrow space below an air bag module.

According to the invention, the mounting screw retainer structure having the projection for retaining the mounting screw in the loosened condition of the mounting screw can be obtained with a simple configuration. Further, the amount of projection of the threaded portion of the mounting screw from the lower end of the screw hole in the loosened condition of the mounting screw is small, so that the lower end portion of the mounting screw does not interfere with any other related component. Accordingly, the number of working steps in removing one of the separate cases from the other or remounting the former to the latter can be reduced.

Additionally, according to the invention, the mounting screw does not fall down even when one of the separate cases is turned upside down in the loosened condition of the mounting screw.

Further, according to the invention, the cover as one of the separate cases can be easily removed and remounted in the air cleaner box whose installation space is narrow.

Still further, according to the invention, the cover of the air cleaner box can be easily removed and remounted in such a layout that an air bag module is installed in a motorcycle and that the air cleaner box is located in a narrow space below the air bag module.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
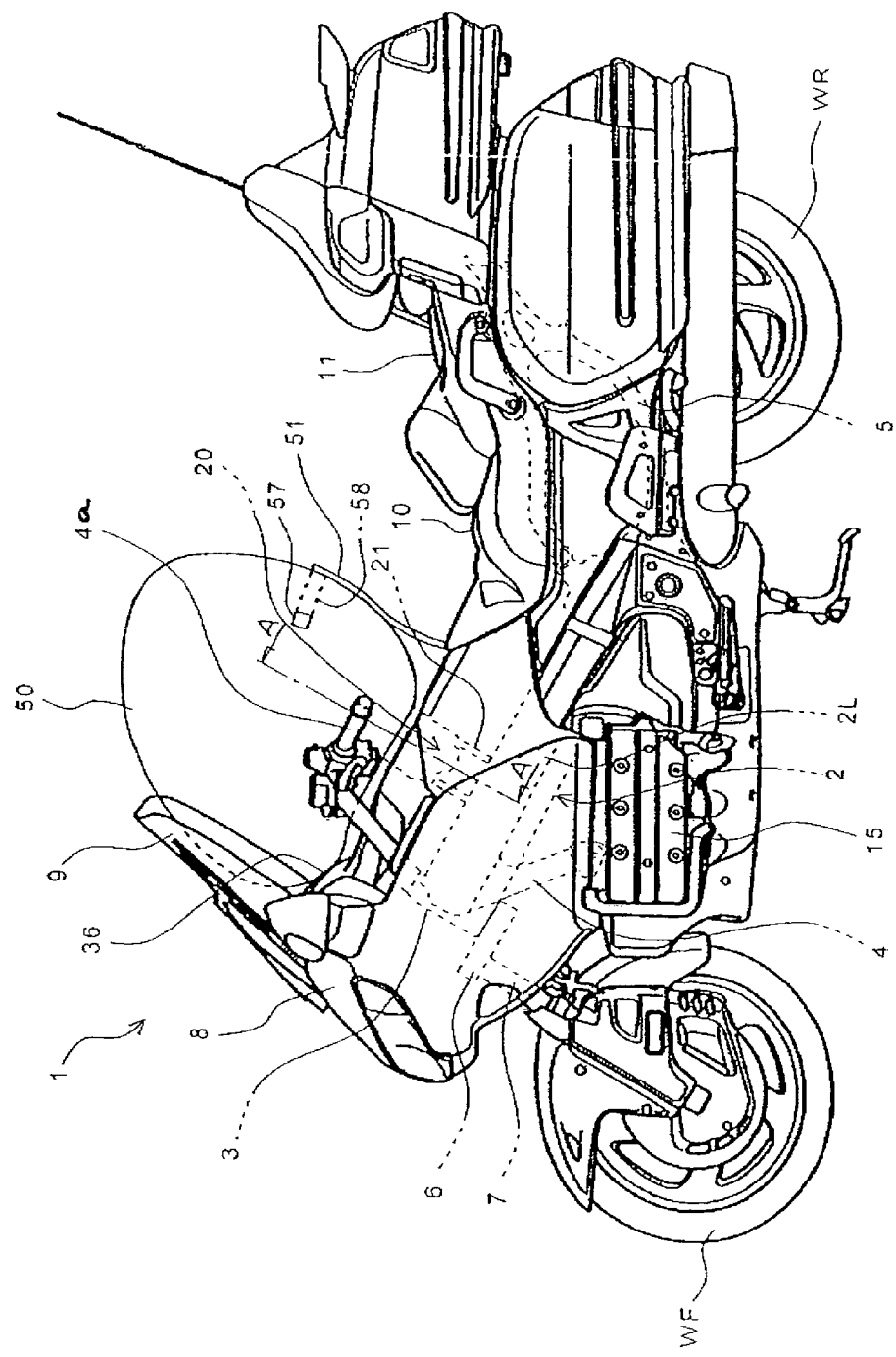
FIG. 1 is a general illustration of a motorcycle using a mounting screw retainer structure according to a preferred embodiment of the present invention.

A preferred embodiment of the present invention will now be described in detail with reference to the drawings. FIG. 1 is a general side view of a motorcycle 1 according to a preferred embodiment of the present invention. The motorcycle 1 has a frame 2 composed mainly of a head pipe 3 and a pair of right and left upper tubes 2R and 2L (the right upper tube 2R being shown in FIG. 3) extending rearward from the head pipe 3 so as to be inclined down toward the rear end of the vehicle. A pair of lower tubes 4 extend downward from the upper tubes 2R and 2L at a position near the head pipe 3, and an engine 15 as a driving source is fixedly hung from the lower ends of the lower tubes 4. A pair of right and left front forks 7 steerable by a handle 4a are pivotably mounted through a lower bracket 6 to the head pipe 3, and a front wheel WF is rotatably supported through its axle to the lower ends of the front forks 7. A seat frame 5 for supporting a main seat 10 and a rear seat 11 is connected to a rear portion of the frame 2. Further, a swing arm (not shown) is pivotably connected to the frame 2, and a rear wheel WR as a drive wheel is rotatably supported through its axle to the rear ends of the swing arm.

The motorcycle 1 is provided with an air bag 50 adapted to be inflated into a substantially spherical shape having such a size as to cover the upper side of the main seat 10 and to touch a meter case 36 and the vicinity of a windscreen 9 provided at the upper end of an upper cowl 8 in the event that an impact greater in level than a predetermined value is applied to the vehicle body. An air bag module 20 including the air bag 50 and an inflator (not shown) for generating a gas for inflating the air bag 50 is fixed through a pair of supporting stays 21 to the upper tubes 2R and 2L at positions on the front side of a rider seating position on the main seat 10 in the longitudinal direction of the vehicle. These fixed positions of the air bag module 20 are set between a meter cover (not shown) located above the head pipe 3 and the main seat 10.

The inflation of the air bag 50 is performed in this manner. The gas generated from the inflator is instantaneously supplied to the air bag 50 folded in the air bag module 20. As a result, a plurality of weak portions formed on three side surfaces of the air bag module 20 having a boxlike shape are broken by the pressure of this gas supplied to the air bag 50, thereby inflating the air bag 50. A pair of supporting belts 51 are connected at their upper ends to a rear portion of the air bag 50, so as to keep the air bag 50 at a proper position in restraining the rider. The lower ends of the supporting belts 51 are firmly secured to a vehicle body member at a position below the main seat 10.

Figure 2:
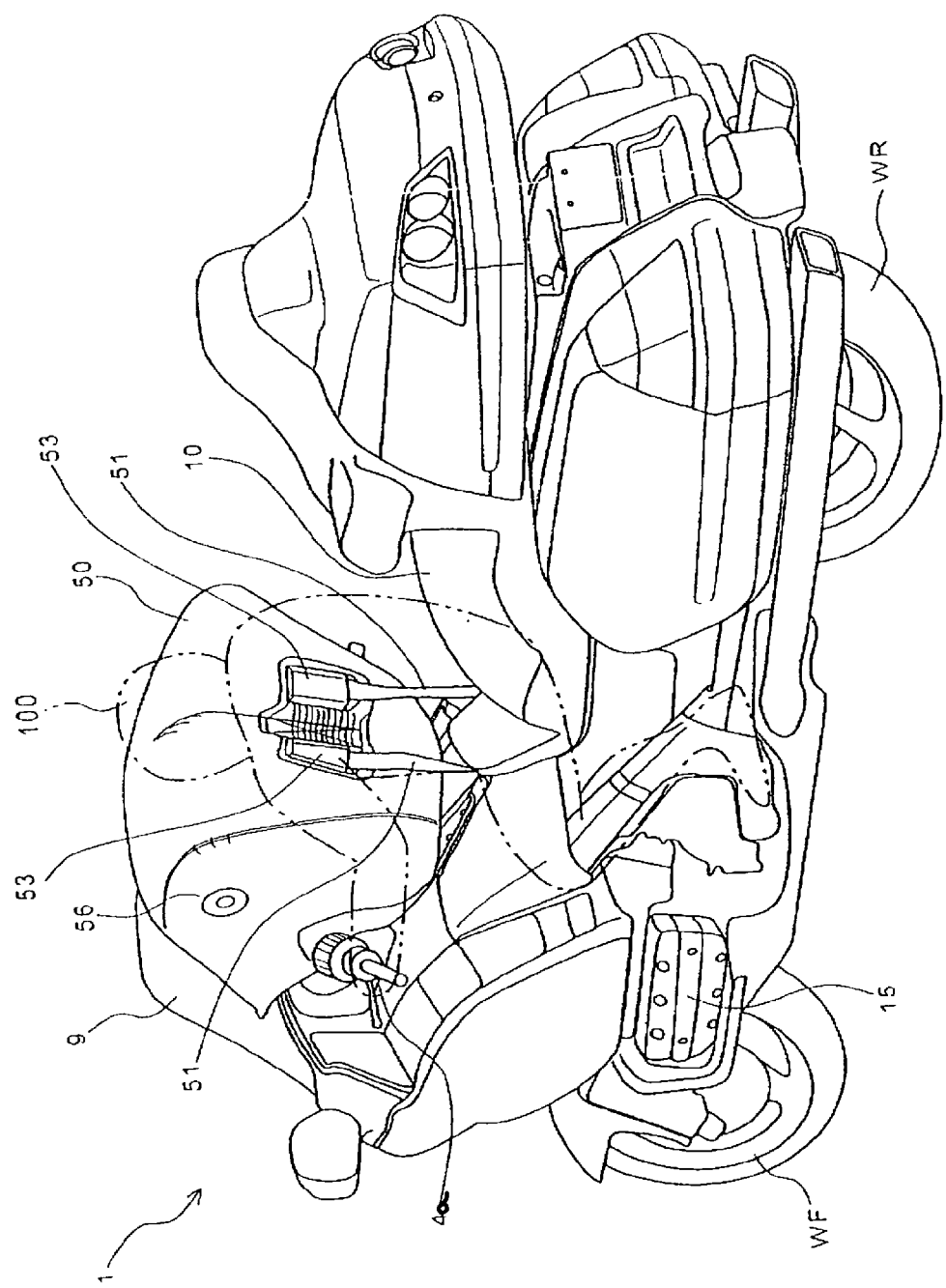
FIG. 2 is a perspective illustration of the motorcycle according to an embodiment of the present invention.

FIG. 2 is a perspective view of the motorcycle 1 at the time the air bag 50 is inflated. The rear surface of the air bag 50 in its inflated condition as opposed to the rider is formed as a substantially V-shaped surface as viewed in plan, so as to effectively embrace the rider. The air bag 50 in its inflated condition is supported not only by the supporting belts 51, but also by the whole of members located below front and lower portions of the air bag 50, including the handle 4a and the meter case 36. Further, the right and left side surfaces of the air bag 50 at its upper portion are formed with a pair of vent holes 56 (e.g., $\phi$ 45) for discharging the gas from the air bag 50 at a proper speed under the condition where the rider is being restrained by the air bag 50.

Figure 3:
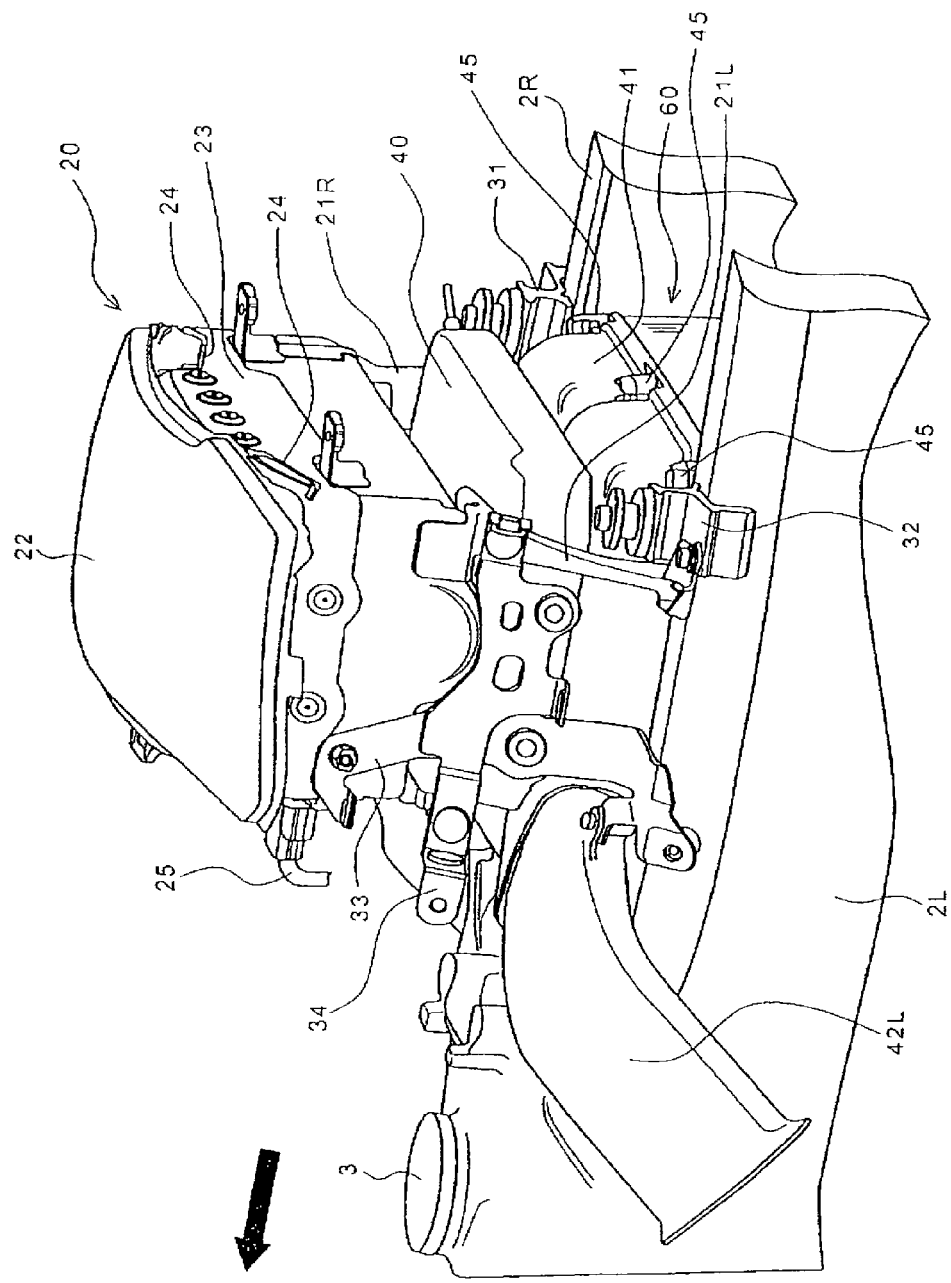
FIG. 3 is a perspective view showing a mounting structure of an air bag module according to an embodiment of the present invention.

FIG. 3 is a perspective view showing a mounting structure of the air bag module 20. In FIG. 3, the same reference numerals as those shown in FIGS. 1 and 2 denote the same or like parts. The air bag module 20 has a casing 23, and the right and left supporting stays 21R and 21L are welded to the casing 23 at its lower portion. Further, a plurality of supporting members 30 (not shown), 31, and 32 are welded to the upper tubes 2R and 2L, and the supporting stays 21R and 21L are fixed to the supporting members 30, 31, and 32 by given bolts. A connector 25 is provided on the front surface of the casing 23, so as to input an ignition signal to the inflator accommodated in the casing 23. The casing 23 is covered by a substantially rectangular module cover 22 adapted to be pivotably opened about its front side at the time of inflation of the air bag 50.

An air cleaner box 60 for cleaning the outside air to be introduced into the engine 15 and the upper cover 41 of the air cleaner box 60 is located so as to be interposed between the upper tubes 2R and 2L, and a substantially flat box-shaped audio unit 40 is located above the air cleaner box 60. A third supporting stay 33 is connected between the casing 23 and the upper tube 2L. Fixed to the third supporting stay 33 are an FI unit supporting stay 34 for fixing a fuel injection control (FI) unit (not shown) and a left air duct 42L for introducing the outside air into the air cleaner box 60 from a front side of a vehicle. Further, the rear surface of the casing 23 opposed to the rider is formed with a pair of slits 24 for passing the supporting belts 51.

According to the mounting structure of the air bag module 20, the space below the air bag module 20 as formed as the result of the optimum location of the air bag module 20 can be effectively used as an installation space for other components, so that the volume of the installation space for the air bag module 20 can be reduced. Further, by removing the FI unit supporting stay 34 and the third supporting stay 33 in the mounted condition shown in FIG. 3, the audio unit 40 and an upper cover 41 of the air cleaner box 60 can be removed from the left front side of the vehicle without displacing or removing the air bag module 20. Accordingly, the maintenance of the air cleaner box 60 including the replacement of a substantially flat box-shaped air filter 44 (see FIG. 4) accommodated in the air cleaner box 60 can be easily performed.

Figure 4:
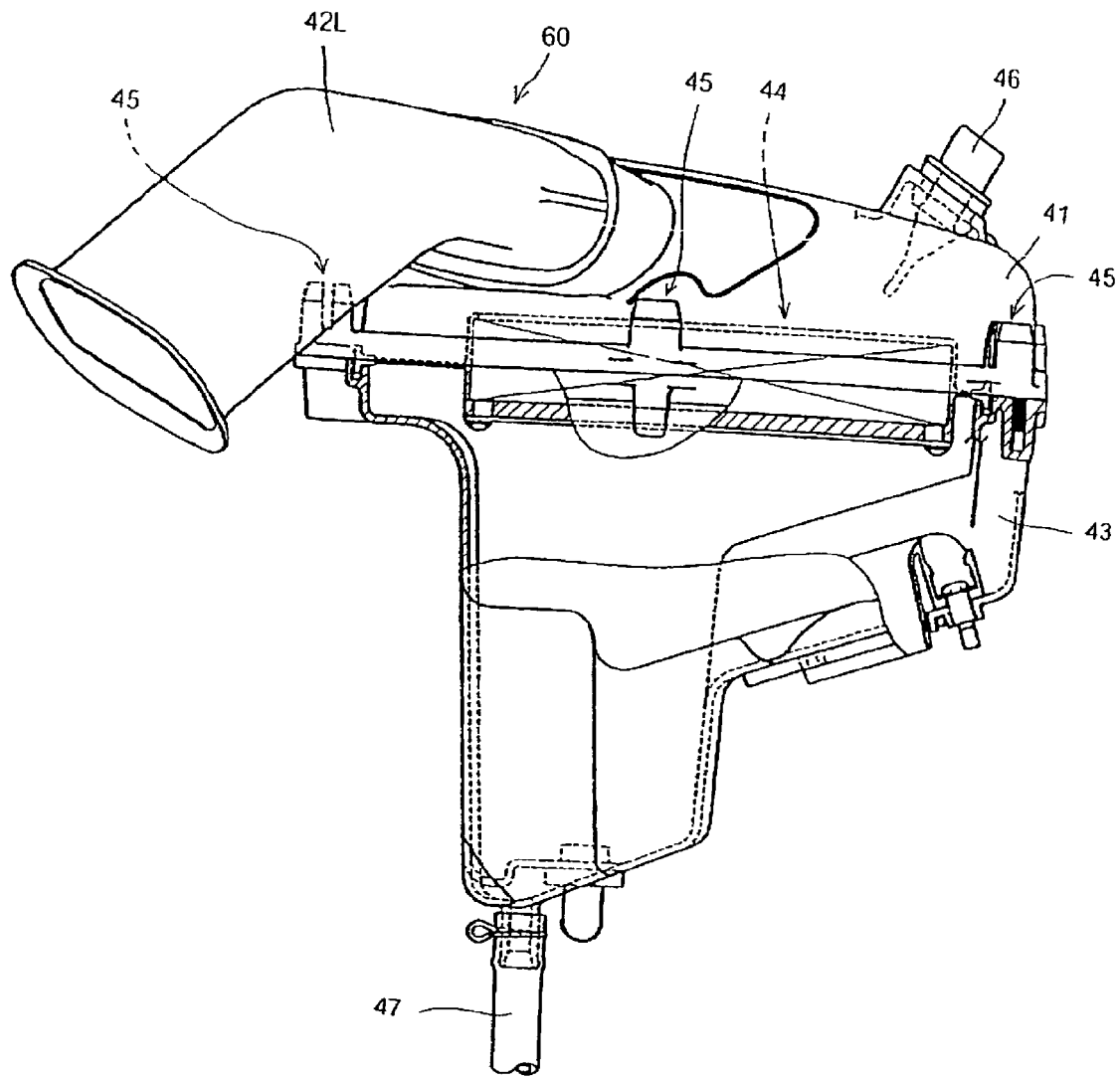
FIG. 4 is a side view of an air cleaner box according to an embodiment of the present invention.

FIG. 4 is a side view of the air cleaner box 60 according to the present invention. In FIG. 4, the same reference numerals as those shown in FIGS. 1 to 3 denote the same or like parts. The air cleaner box 60 includes the upper cover 41 to which the left air duct 42L is connected, a lower case 43 extending downward and having a lower end portion provided with a drain hose 47, and the substantially flat box-shaped air filter 44 provided between the upper cover 41 and the lower case 43. The upper cover 41 and the lower case 43 are fastened together by eight fastening portions 45. The upper cover 41 and the lower case 43 are formed of synthetic resin having elasticity, and a packing is provided along a joining portion between the upper case 41 and the lower case 43 to seal the joining portion. Further, the intake temperature sensor 46 is provided on an upper surface of the upper case 41. The mounting screw retainer structure according to the present invention is applied to each fastening portion 45 for fastening the upper cover 41 and the lower case 43.

Figure 5:
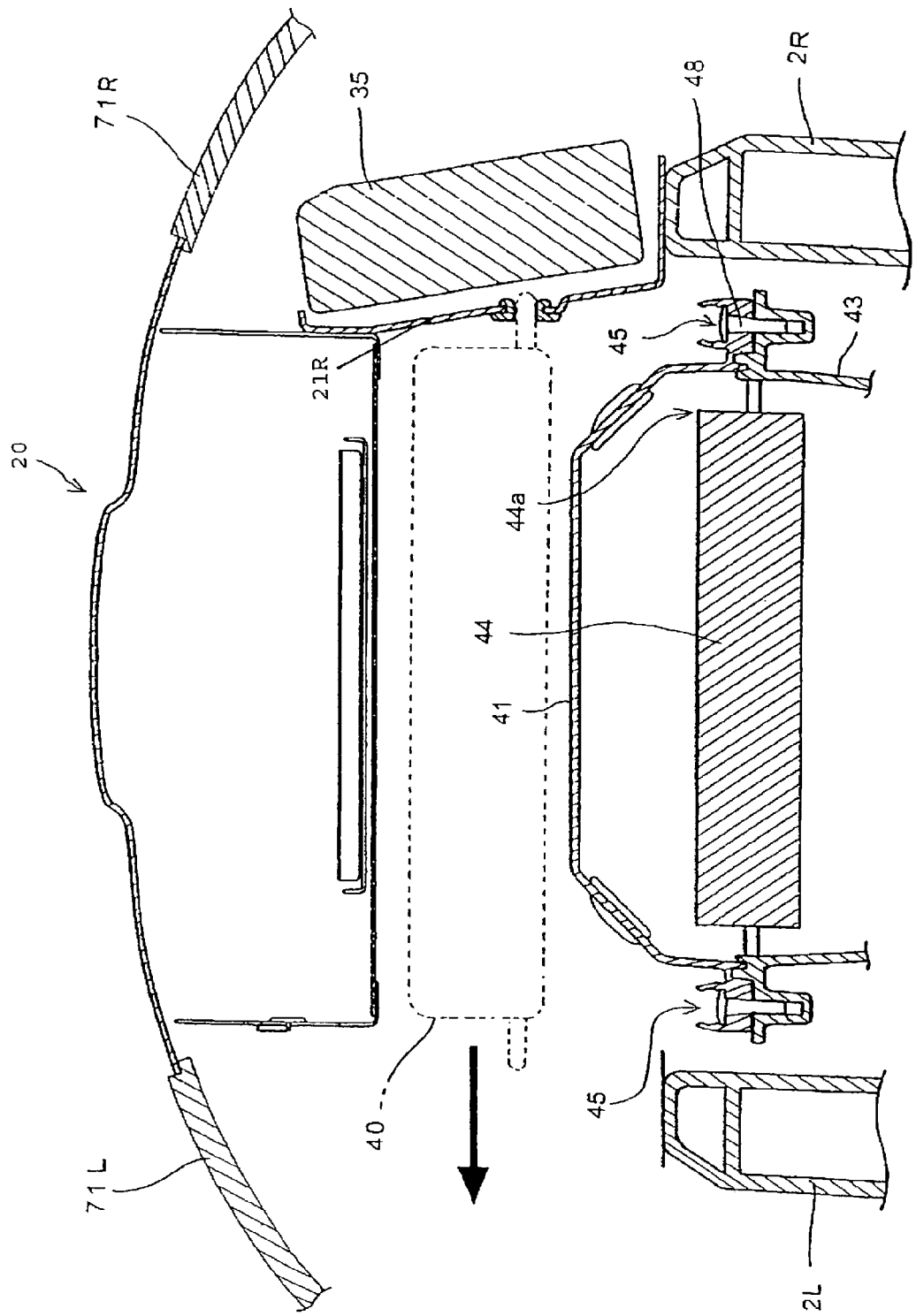
FIG. 5 is a cross section taken along the line A-A in FIG. 1.
Figure 6:
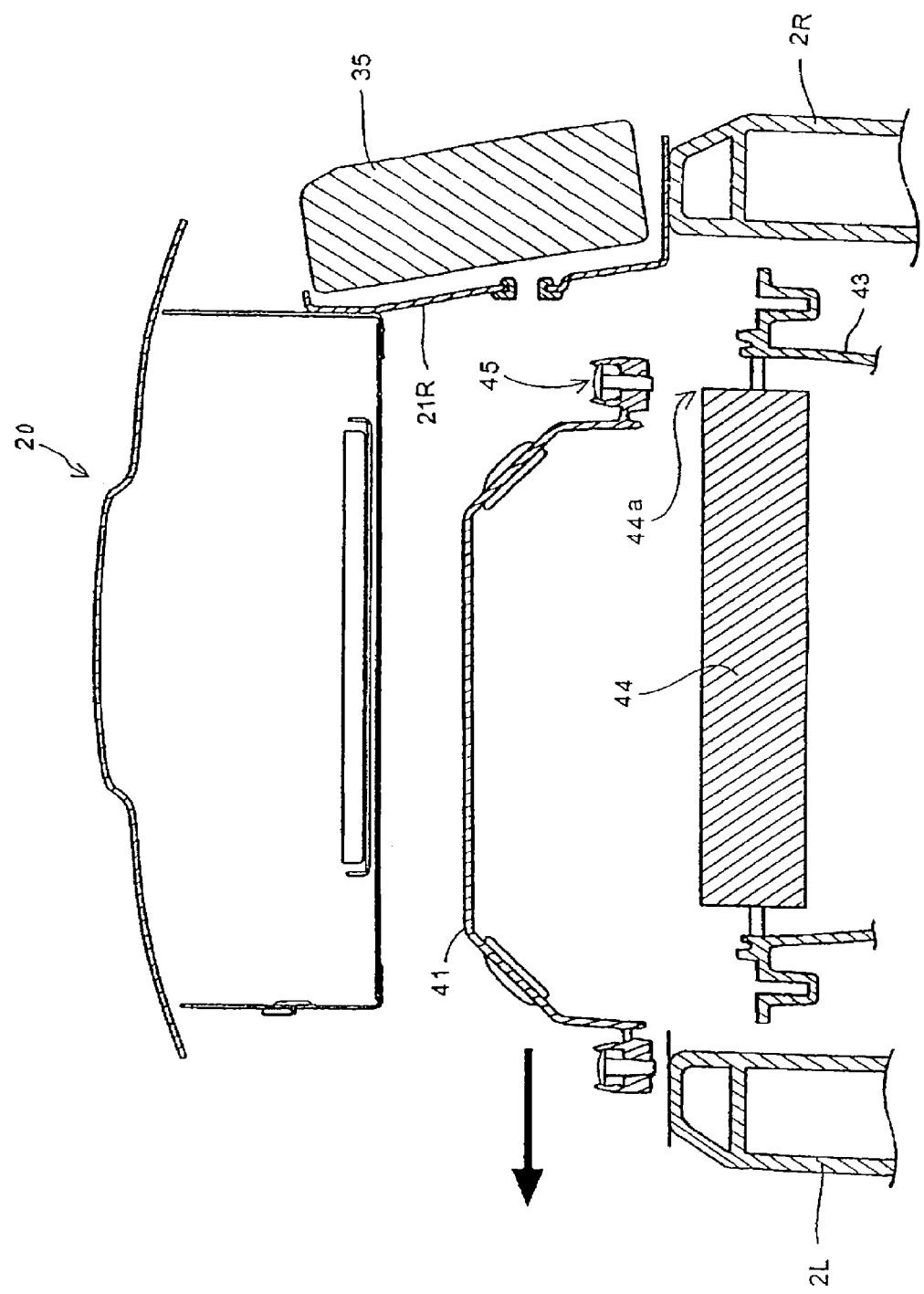
FIG. 6 is an illustration similar to FIG. 5, showing a process of removing an upper cover after the condition shown in FIG. 5.

FIGS. 5 and 6 are a cross section taken along the line A-A in FIG. 1. In FIGS. 5 and 6, the same reference numerals as those shown in FIGS. 1 to 4 denote the same or like parts. As mentioned above, the air bag module 20 is supported by the right supporting stay 21R and the left supporting stay 21L (see FIG. 3) respectively fixed to the upper surfaces of the right and left upper tubes 2R and 2L. Further, an air bag ECU 35 for controlling the inflating operation of the air bag 50 according to information from various sensors for measuring an impact etc. applied to the vehicle body is mounted on the right supporting stay 21R.

FIG. 5 shows a condition where the audio unit 40 has been removed from the state shown in FIG. 3. In this condition, the upper cover 41 can be removed in the direction shown by an arrow after loosening a plurality of mounting screws 48 in the fastening portions 45. However, the space between the upper cover 41 and the air bag module 20 is small, and the space between the right supporting stay 21R and the upper cover 41, enough for a worker's hand to insert, is also confined, so that there is a high possibility that the worker may erroneously drop the mounting screws 48 when loosening them. If the worker has dropped the mounting screws 48, the worker must recover the mounting screws 48 from the gap between parts arranged concentratedly, causing an increase in number of working steps. Further, if the lower end of each mounting screw 48 projects from the bottom surface of the upper cover 41 after loosening the mounting screws 48 to such a condition where the upper cover 41 can be removed, there is a possibility that the lower end of each mounting screw 48 may interfere with a corner portion 44a of the air filter 44, for example, so that the upper cover 41 may not be smoothly removed. The mounting screw retainer structure according to this preferred embodiment can solve these problems as shown in FIG. 6.

Figure 7A:
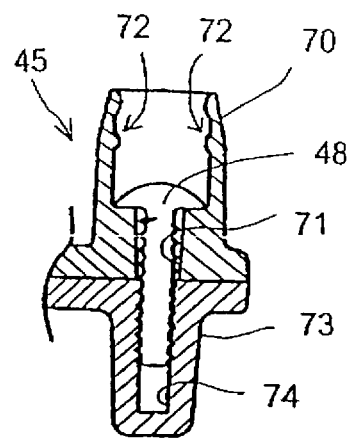
FIG. 7 is an enlarged sectional views illustrating the mounting screw retainer structure according to an embodiment of the present invention.
Figure 7B:
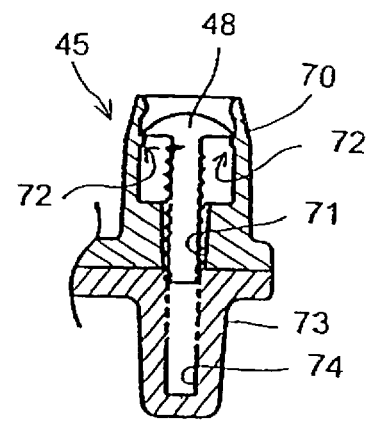
Figure 7C:
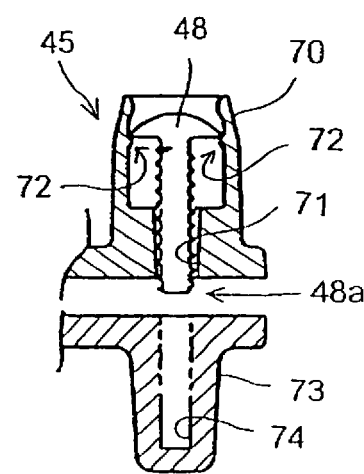

FIGS. 7(a) to 7(c) are enlarged sectional views illustrating the mounting screw retainer structure according to this preferred embodiment. In FIGS. 7(a) to 7(c), each fastening portion 45 is shown, wherein it is composed of an upper retaining portion 70 formed as a part of the upper cover 41, a lower retaining portion 73 formed as a part of the lower case 43, and the mounting screw 48 for fastening the upper retaining portion 70 and the lower retaining portion 73. Each mounting screw 48 used in this preferred embodiment is a tapping screw capable of tapping by itself.

FIG. 7(a) shows a condition where the mounting screw 48 is tightened to fasten the upper and lower retaining portions 70 and 73. The upper retaining portion 70 has an upper screw hole 71, and the lower retaining portion 73 has a lower screw hole 74. The upper screw hole 71 is larger in diameter than the lower screw hole 74. The lower screw hole 74 has a diameter slightly smaller than the diameter of the threaded portion of the mounting screw 48, so as to allow the tapping with the threaded portion of the mounting screw 48. Accordingly, the threaded portion of the mounting screw 48 is loosely inserted through the upper screw hole 71, and a tightening force for fastening the upper and lower retaining portions 70 and 73 is produced between the lower screw hole 74 and the head portion of the mounting screw 48. The mounting screw retainer structure according to this preferred embodiment is characterized in that the upper retaining portion 70 has a cylindrical guide formed around the upper screw hole 71 so as to allow the head portion of the mounting screw 48 to move upward along the inner wall of this cylindrical guide and that a projection 72 is formed on the inner wall of this cylindrical guide.

FIG. 7(b) shows a condition where the mounting screw 48 is loosened to a predetermined position. The projection 72 is formed at such a position that when the mounting screw 48 is loosened to this position where the threaded portion of the mounting screw 48 is disengaged from the internal thread of the lower screw hole 74, the head portion of the mounting screw 48 has passed through the projection 72 and the outer circumference of the head portion comes into engagement with the projection 72. Accordingly, even when the upper and lower retaining portions 70 and 73 are separated from each other as shown in FIG. 7(c), there is no possibility that the mounting screw 48 may fall down from the upper retaining portion 70. Furthermore, the amount of projection of a lower end portion 48a of the mounting screw 48 from the lower surface of the upper retaining portion 70 is slight as shown in FIG. 7(c). The threaded portion of mounting screw 48 is considered to be the distance from the bottom of the head to the tip, whether or not that distance is covered with threads. Accordingly, in removing the upper cover 41 of the air cleaner box 60 as shown in FIG. 5, there is no possibility that the lower end portion 48a of each mounting screw 48 may interfere with the corner portion 44a of the air filter 44, thereby realizing a smooth removal/attachment operation for the upper cover 41.

While the projection 72 is a ringlike projection continuously formed on the inner wall of the cylindrical guide of the upper retaining portion 70 in this preferred embodiment, the projection 72 may be formed as a plurality of discrete projections arranged along an inner circumference on the inner wall of the cylindrical guide of the upper retaining portion 70. Further, the cylindrical guide of the upper retaining portion 70 is tapered at its upper portion toward the upper end thereof, so that even when the upper opening of the cylindrical guide of the upper retaining portion 70 is directed downward in the condition where the head portion of the mounting screw 48 is retained by the projection 72, the escape of the mounting screw 48 from the upper retaining portion 70 can be reliably prevented.

As mentioned above, the upper cover 41 is formed of synthetic resin having elasticity, so that the upper retaining portion 70 as a part of the upper cover 41 is formed of synthetic resin having elasticity. Accordingly, by elastically deforming the upper opening of the upper retaining portion 70, the mounting screw 48 can be arbitrarily removed from the upper retaining portion 70. Additionally, the lower end portion 48a of the mounting screw slightly projecting from the lower surface of the upper retaining portion 70 as shown in FIG. 7(c) has a function of facilitating the positioning of the upper retaining portion 70 in remounting the upper cover 41 onto the lower case 43, thereby contributing to a reduction in number of working steps.

The shapes or the like of the projections, the fastening portions, and the mounting screws are not limited to those shown in this embodiment, but various modifications may be made. Further, the application of the mounting screw retainer structure according to the present invention is not limited to the air cleaner box as in this preferred embodiment, but this retainer structure is widely applicable to various components.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A retainer structure for a mounting screw for fastening separate cases together, comprising:
    a screw hole formed in one of said cases;
    a guide member formed in said one case and communicating with an upper end of the screw hole, said guide member having an inner diameter equal to or slightly larger than a diameter of a head portion of the mounting screw;
    a projection formed on an inner wall of said guide member, at an upper portion thereof;
    wherein a distance between said projection and a lower end of said screw hole is slightly less than a length of a threaded portion of the mounting screw.

2. The retainer structure of claim 1,
    wherein said projection loosely retains the mounting screw, and
    an upper portion of said guide member above said projection, is inwardly tapered to have an inner diameter slightly smaller than a diameter of the head portion of the mounting screw.

3. The retainer structure of claim 1,
    wherein the separate cases comprise a cover and a case for an air cleaner box.

4. The retainer structure of claim 2,
    wherein the separate cases comprise a cover and a case for an air cleaner box.

5. The retainer structure of claim 3,
    wherein said air cleaner box is disposed in a space below an air bag module.

6. The retainer structure of claim 4,
    wherein said air cleaner box is disposed in a space below an air bag module.

7. The retainer structure of claim 5,
    wherein said air bag and air cleaner are mounted on a motorcycle.

8. The retainer structure of claim 6,
    wherein said air bag and air cleaner are mounted on a motorcycle.

* * * * *